US012709092B2

(12) United States Patent
Fukakusa

(10) Patent No.: US 12,709,092 B2
(45) Date of Patent: Aug. 18, 2026

(54) CONVEYANCE DEVICE AND CONVEYANCE METHOD

(71) Applicant: FUJI CORPORATION, Chiryu (JP)

(72) Inventor: Shoji Fukakusa, Yokkaichi (JP)

(73) Assignee: FUJI CORPORATION, Chiryu (JP)

( * ) Notice: Subject to any disclaimer, the term of this patent is extended or adjusted under 35 U.S.C. 154(b) by 0 days.

(21) Appl. No.: 18/983,649

(22) Filed: Dec. 17, 2024

(65) Prior Publication Data

US 2025/0214333 A1 Jul. 3, 2025

(30) Foreign Application Priority Data

Dec. 28, 2023 (JP) ................................ 2023-222294

(51) Int. Cl.
*B41F 15/34* (2006.01)
*B41F 21/08* (2006.01)
*B41F 33/16* (2006.01)

(52) U.S. Cl.
CPC .............. *B41F 21/08* (2013.01); *B41F 15/34* (2013.01); *B41F 33/16* (2013.01)

(58) Field of Classification Search
CPC .......... B41F 15/34; B41F 21/08; B41F 33/16; B41F 21/3316
See application file for complete search history.

(56) References Cited

U.S. PATENT DOCUMENTS

| | | | | |
|---|---|---|---|---|
| 9,873,244 | B1 * | 1/2018 | Jurman | B25B 5/02 |
| 11,338,568 | B2 * | 5/2022 | Yokoi | H05K 3/1225 |
| 2020/0391531 | A1 * | 12/2020 | Losiewicz | B41F 15/40 |

FOREIGN PATENT DOCUMENTS

| | | | | | |
|---|---|---|---|---|---|
| CN | 114132056 | A | * 3/2022 | | B41F 15/18 |
| JP | 2663954 | B2 | * 10/1997 | | |
| JP | 2009040563 | A | * 2/2009 | | |
| WO | WO-2017216948 | A1 | * 12/2017 | | B41F 15/36 |
| WO | WO-2022234649 | A1 | * 11/2022 | | B41F 15/0881 |

* cited by examiner

*Primary Examiner* — Christopher E Mahoney
*Assistant Examiner* — Marissa Ferguson-Samreth
(74) *Attorney, Agent, or Firm* — Oblon, McClelland, Maier & Neustadt, L.L.P.

(57) ABSTRACT

A conveyance device includes a pair of rails that conveys and positions a conveyance target object; a lifting and lowering section configured to lift and lower a pressing member; a moving section configured to move the pressing member in the extending direction of the pair of rails; a clamp section configured to clamp the conveyance target object against the pair of rails; and a control section configured to control the lifting and lowering section and the moving section such that the pressing member is lowered and the attraction portion of the pressing member is attracted and the conveyance target object is conveyed to the predetermined position, and after controlling the clamp section, control the lifting and lowering section and the moving section such that the pressing member is retracted from the conveyance target object.

3 Claims, 9 Drawing Sheets

CONVEYANCE DEVICE AND CONVEYANCE METHOD

TECHNICAL FIELD

The present specification discloses a conveyance device and a conveyance method.

BACKGROUND ART

Conventionally, as the conveyance device of this type, there has been proposed a working device (printing device) including a pair of left and right support rails extending forward and backward, a head including a pusher and a pusher lifting and lowering device that lifts and lowers the pusher, and a head moving device that moves the head forward and backward (for example, refer to Patent Literature 1). The working device lowers the pusher by the pusher lifting and lowering device to protrude downward, and moves the pusher forward and backward together with the head by the head moving device, thereby conveying a conveyance target object, which is on the support rails (screen mask or conveyance jig), by pushing the conveyance target object forward and backward.

CITATION LIST

Patent Literature

Patent Literature 1: WO 2022/234649

BRIEF SUMMARY

Technical Problem

In the above-described working device, since the conveyance target object, which is on the support rails, is conveyed by being pushed forward and backward by the pusher, even after the conveyance target object is moved to the target position and the pusher is stopped, the conveyance target object is moved beyond the target position by inertia, and the conveyance target object cannot be positioned at the target position.

A main object of the present disclosure is to more reliably position a conveyance target object at a predetermined position in a conveyance device that conveys the conveyance target object on rails by pushing the conveyance target object by a pressing member.

Solution to Problem

The present disclosure employs the following means in order to achieve the main purpose described above.

The gist of a conveyance device of the present disclosure relates to a conveyance device including a pair of rails extending parallel to each other in a horizontal direction, the conveyance device being for conveying a conveyance target object used in a production line on the pair of rails, and positioning the conveyance target object at a predetermined position, the conveyance device including:

a pressing member having an attraction portion configured to attract an attraction target portion of the conveyance target object on a surface orthogonal to an extending direction of the rails;

a lifting and lowering section configured to lift and lower the pressing member;

a moving section configured to move the pressing member in the extending direction of the pair of rails;

a clamp section configured to clamp the conveyance target object on the pair of rails against the pair of rails; and a control section configured to control the lifting and lowering section and the moving section such that the pressing member is lowered and the attraction portion of the pressing member is attracted to the attraction target portion of the conveyance target object, control the moving section such that the conveyance target object is conveyed to the predetermined position, and after controlling the clamp section such that the conveyance target object is clamped at the predetermined position, control the lifting and lowering section and the moving section such that the pressing member is retracted from the conveyance target object.

The conveyance device of the present disclosure attracts the conveyance target object (an attraction target portion) to the pressing member (attraction portion), then conveys the conveyance target object to the predetermined position by pressing the conveyance target object by the pressing member, and after clamping the conveyance target object at the predetermined position, retracts the pressing member from the conveyance target object. Thus, the conveyance target object can be more reliably positioned at the predetermined position.

The gist of a conveyance method of the present disclosure relates to a conveyance method for conveying a conveyance target object used in a production line on a pair of rails and position the conveyance target object at a predetermined position using the pair of rails extending parallel to each other in a horizontal direction and a pressing member, the conveyance method including:

attracting the pressing member to the conveyance target object on a surface orthogonal to an extending direction of the rails;

conveying the conveyance target object to the predetermined position by moving the pressing member in the extending direction of the rails; and retracting the pressing member from the conveyance target object after clamping the conveyance target object at the predetermined position.

The conveyance method of the present disclosure can achieve the same effect as that of the conveyance device of the present disclosure.

DESCRIPTION OF EMBODIMENTS

Next, an embodiment of the present disclosure will be described with reference to the drawings.

Figure 1:
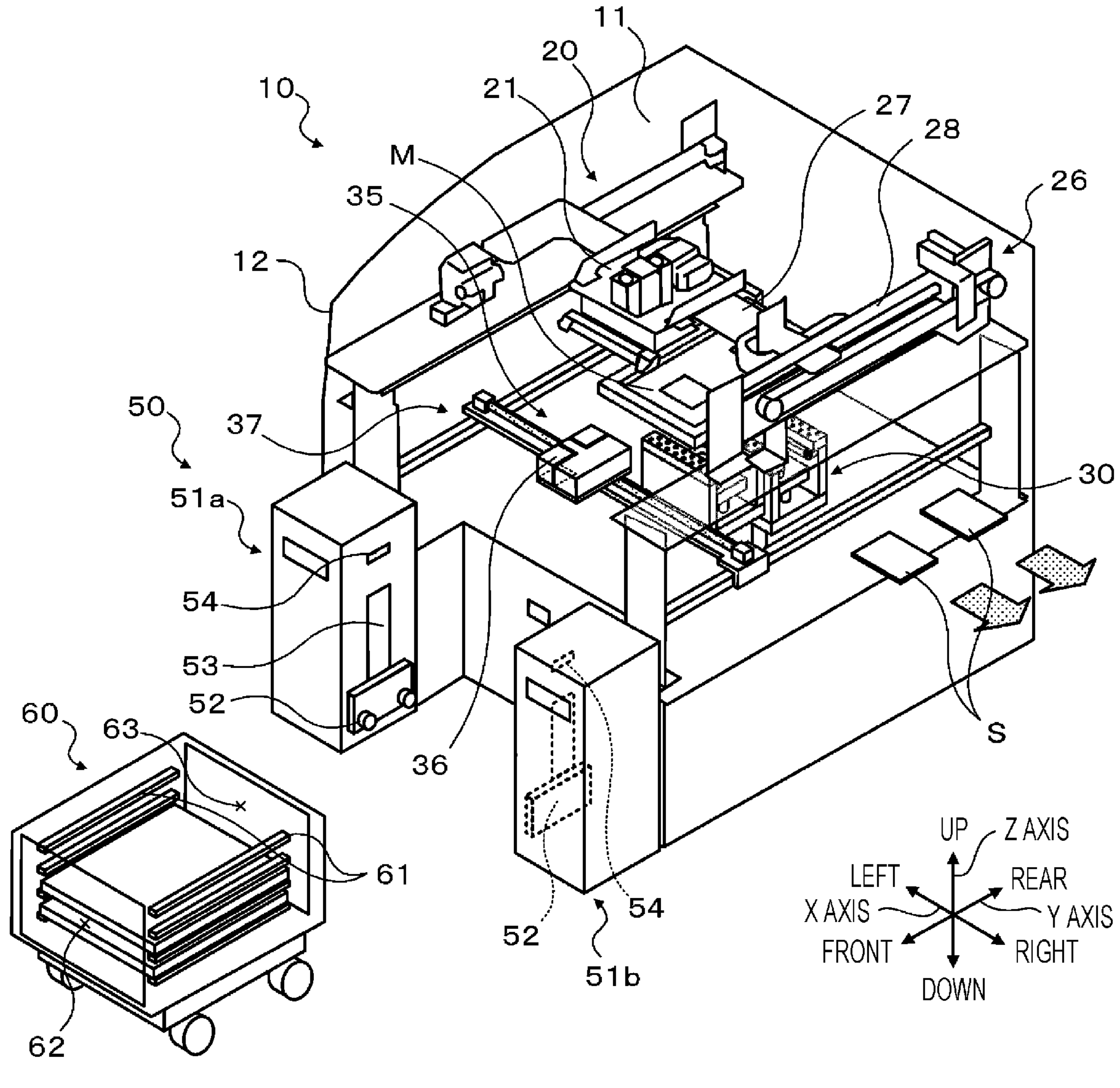
FIG. 1 is a perspective view of a printing device and an accommodation rack.
Figure 2:
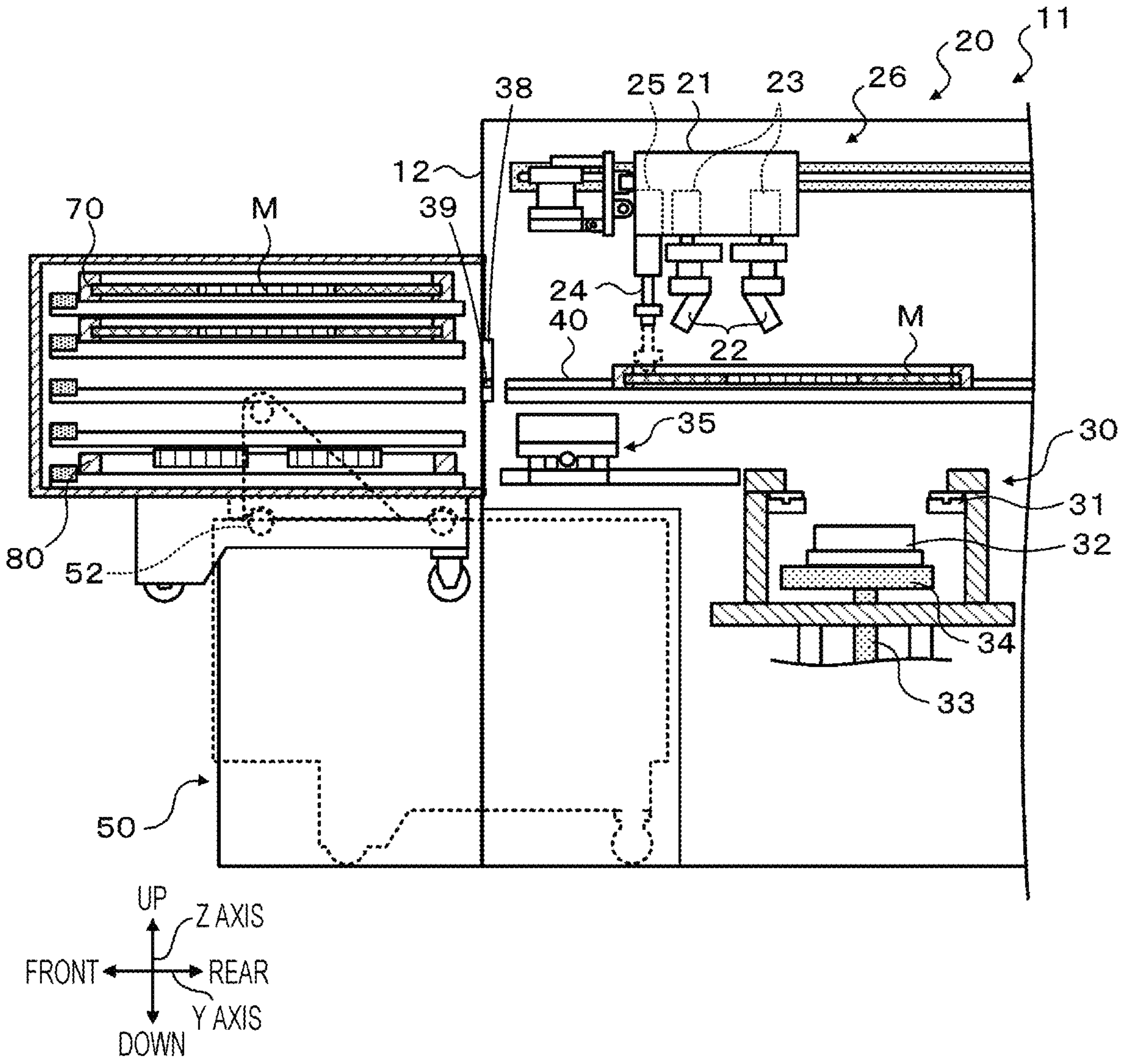
FIG. 2 is a side view of the printing device and the accommodation rack.
Figure 3:
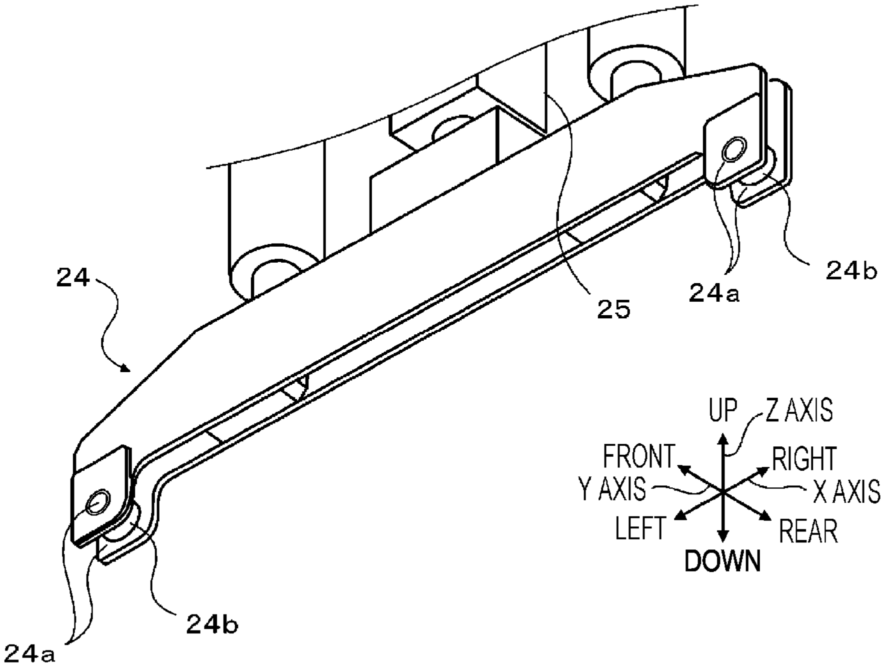
FIG. 3 is a perspective view of a pusher.
Figure 4:
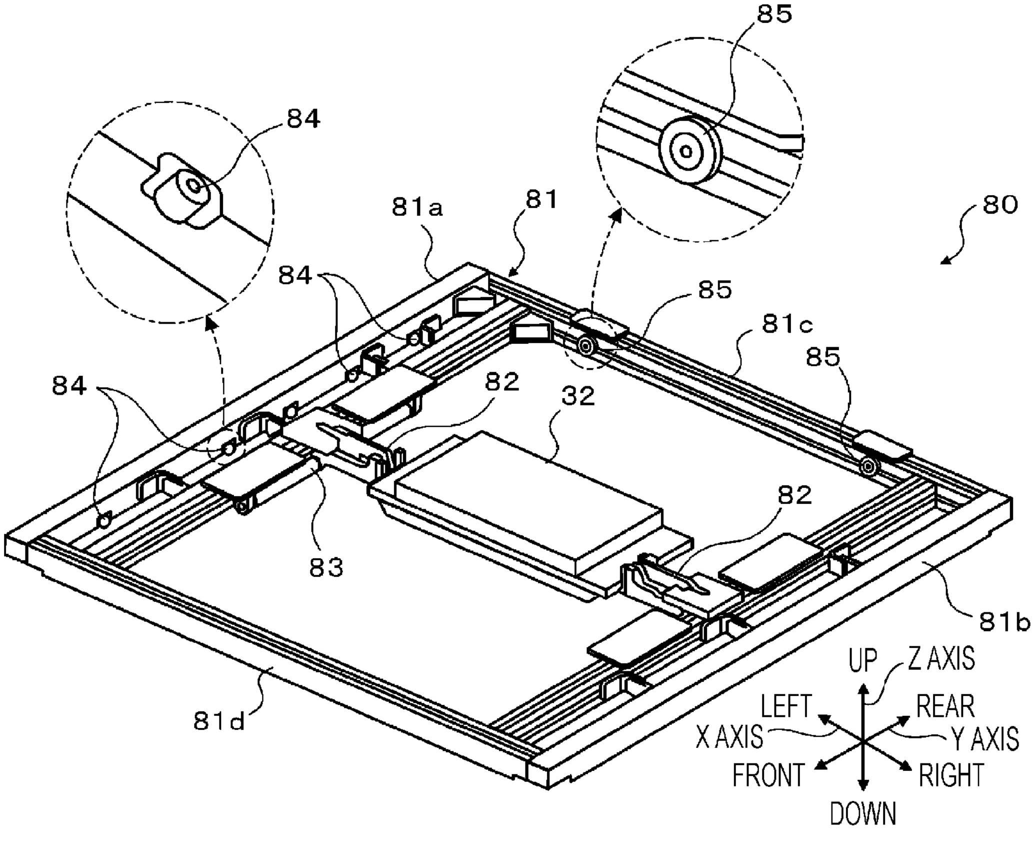
FIG. 4 is a perspective view of a board support member and an exchange frame.
Figure 5:
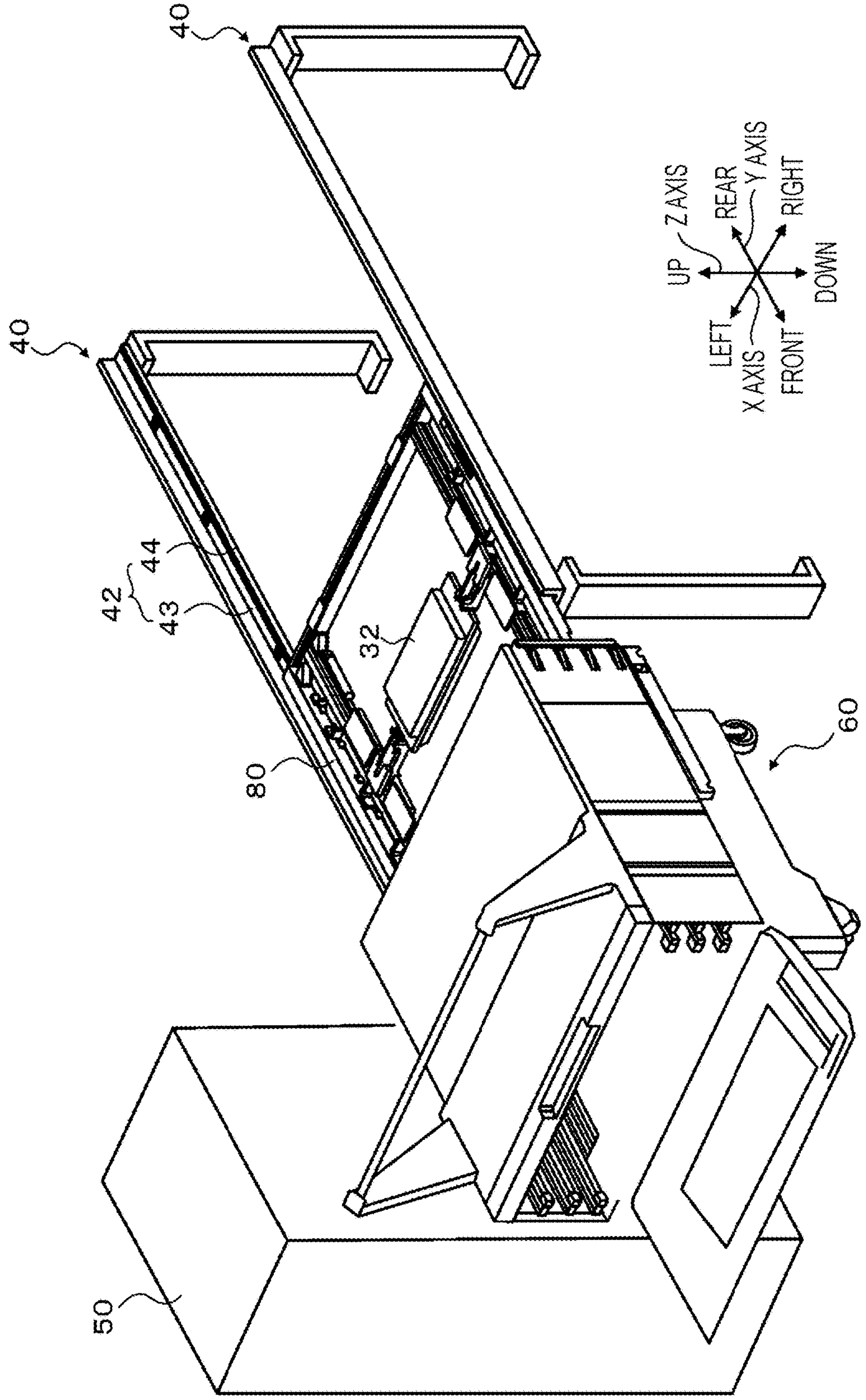
FIG. 5 is a perspective view of the accommodation rack, the exchange frame, and conveyance rails.
Figure 6:
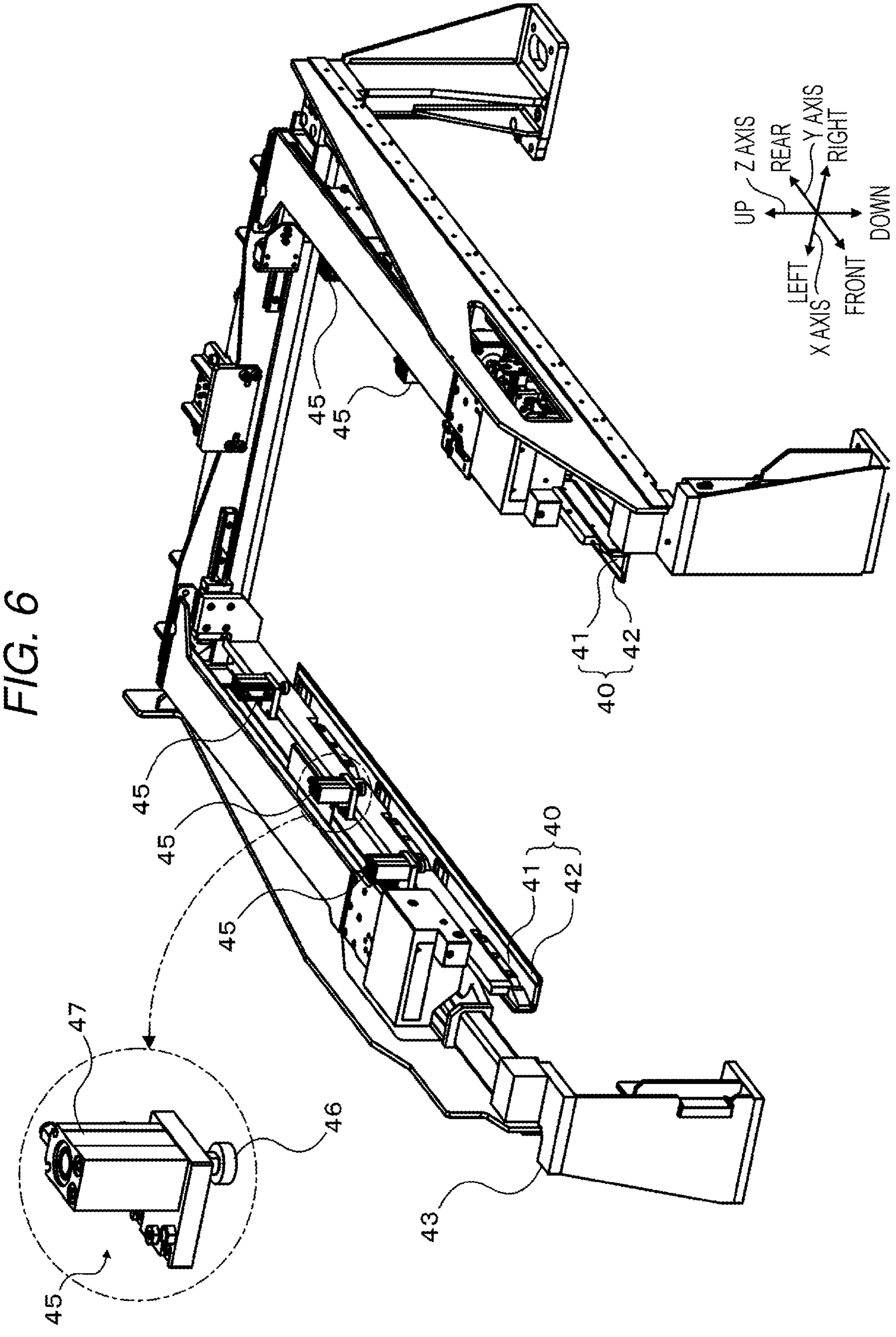
FIG. 6 is a perspective view of the conveyance rails.
Figure 7:
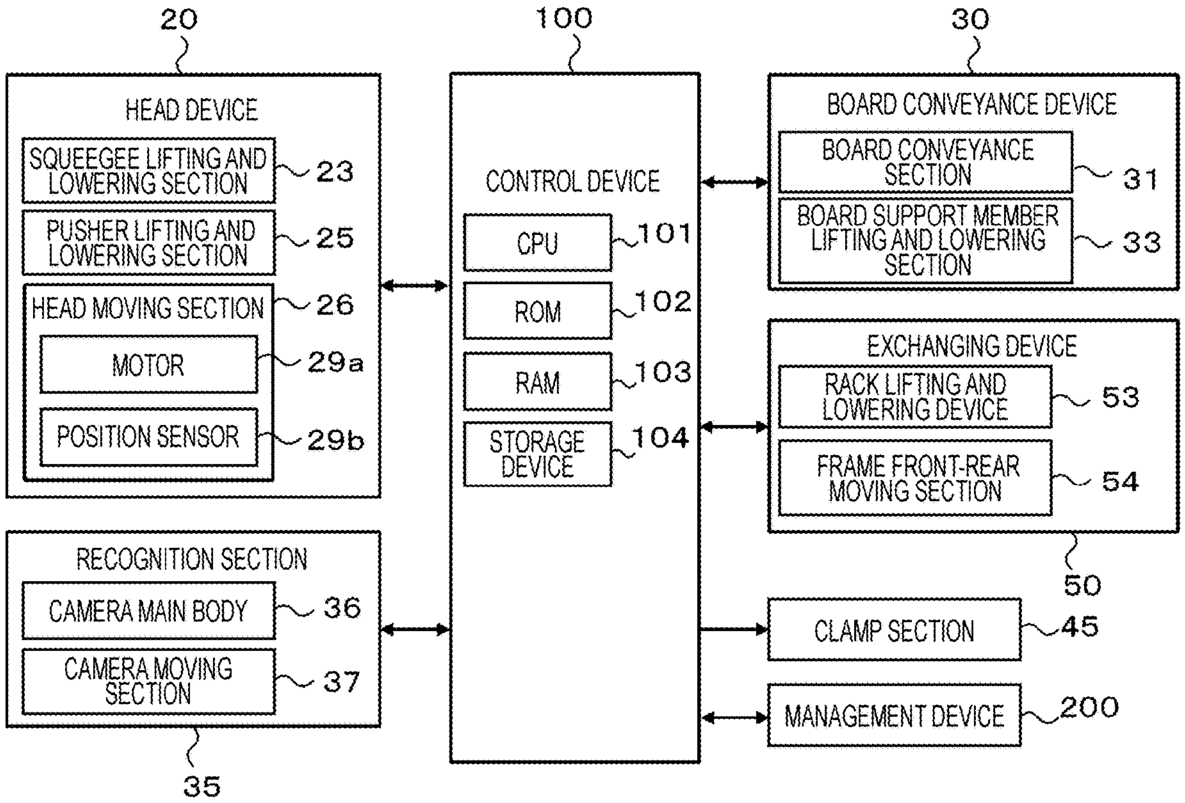
FIG. 7 is a block diagram illustrating an electrical connection relationship of the printing device.

FIG. 1 is a perspective view of printing device 10 and accommodation rack 60. FIG. 2 is a side view of printing device 10 and accommodation rack 60. FIG. 3 is a perspective view of pusher 24. FIG. 4 is a perspective view of board support member 32 and exchange frame 80. FIG. 5 is a perspective view of accommodation rack 60, exchange frame 80, and conveyance rails 40. FIG. 6 is a perspective view of conveyance rails 40. FIG. 7 is a block diagram illustrating an electrical connection relationship of the printing device. In FIGS. 1 to 6, a left-right direction is referred to as an X axis, a front-rear direction is a Y axis, and an up-down direction is a Z axis.

Printing device 10 of the present embodiment is a device for printing a solder paste to board S below via a pattern hole formed in screen mask M by pushing the solder paste on screen mask M into the pattern hole using squeegee 22. Printing device 10 constitutes a production line in combination with a component mounter that mounts an electronic component on board S on which solder is printed. Further, when changing the type of board S to be produced, printing device 10 can automatically exchange screen mask M and board support member 32 that supports board S in accordance with the type of board S.

As illustrated in FIGS. 1 and 2, printing device 10 includes printing device main body 11, housing 12 that accommodates printing device main body 11, exchanging device 50, accommodation rack 60, and control device 100 (see FIG. 7) that controls the entire printing device. Printing device main body 11 includes head device 20, board conveyance device 30, recognition section 35, and conveyance rails 40.

Head device 20 is installed in an upper stage portion of printing device main body 11. As illustrated in FIG. 1, head device 20 includes head main body 21 and head moving section 26 that moves head main body 21 in the front-rear direction (Y-axis direction) that is a printing direction. Head moving section 26 includes guide rail 28 that extends in the front-rear direction, Y-axis slider 27 that moves along guide rail 28, motor 29*a* that drives Y-axis slider 27, and position sensor (encoder) 29*b* that detects the position of head main body 21. As illustrated in FIG. 2, head main body 21 includes pair of front and rear squeegees 22, pair of squeegee lifting and lowering sections 23 each of which is configured with an air cylinder and lifts or lowers corresponding squeegee 22, pusher 24, and pusher lifting and lowering section 25 configured with, for example, an air cylinder and configured to lift and lower pusher 24. Pair of front and rear squeegees 22 are plate-shaped members that extend in the left-right direction (X-axis direction) orthogonal to the printing direction and incline so as to be separated from each other downwards when viewed in the left-right direction. As illustrated in FIG. 3, pusher 24 includes pair of front-rear and left-right first pressing portions 24*a*, with contact surfaces formed on surfaces orthogonal to the front-rear direction (Y-axis direction) and pair of left and right second pressing portions 24*b*, with contact surfaces formed on the lower side. Pair of left and right conveyance rails 40 extending forward and backward are installed in a middle stage portion of printing device main body 11, and pusher 24 is moved forward and backward by head moving section 26 in a state of being lowered by pusher lifting and lowering section 25, thereby moving exchange frame 70, 80, which is on conveyance rails 40, by pushing exchange frame 70, 80 forward and backward by first pressing portions 24*a*. As illustrated in FIG. 2, exchange frame 70, 80 moves inside and outside housing 12 through passage opening 38 provided in the middle stage portion of the front face of housing 12. Passage opening 38 is provided with detection sensor 39 that detects the passage of exchange frame 70, 80.

Board conveyance device 30 is installed in a lower stage portion of printing device main body 11. Board conveyance device 30 conveys in, positions, and supports board S, and brings board S into contact with and separates from screen mask M (back surface). As illustrated in FIG. 2, board conveyance device 30 includes board conveyance section 31 that conveys board S in the left-right direction (X-axis direction), board support member 32 that supports board S conveyed by board conveyance section 31 from below, lifting and lowering table 34 on which board support member 32 is placed, and board support member lifting and lowering section 33 that lifts and lowers board support member 32 together with lifting and lowering table 34. Board support member 32 is exchanged with one of a size suitable for supporting board S in accordance with the type of board S.

Recognition section 35 recognizes board S and board support member 32. As illustrated in FIG. 1, recognition section 35 includes camera main body 36 and camera moving section 37 that moves camera main body 36. Recognition section 35 recognizes the position of board S by reading a mark attached to the upper surface of board S when board S is conveyed and positioned by board conveyance device 30. Recognition section 35 recognizes the position and size of board support member 32 by reading the mark attached to board support member 32 held by exchange frame 80 when exchange frame 80 is conveyed and positioned on conveyance rails 40.

Exchanging device 50 receives accommodation rack 60) that accommodates an exchange member (such as screen mask M or board support member 32) used in printing device main body 11 using exchange frame 70, 80, and conveys the exchange member between accommodation rack 60 and printing device main body 11. As illustrated in FIG. 1, exchanging device 50 includes left unit 51*a* installed on the left side on the front surface (front face) of printing device main body 11 and right unit 51*b* installed on the right side on the front surface of printing device main body 11. Left unit 51*a* and right unit 51*b* include rack support member 52 that receives accommodation rack 60) and supports the lower surface of accommodation rack 60 from both left and right sides, and rack lifting and lowering section 53 that lifts and lowers rack support member 52. Rack lifting and lowering section 53 includes, for example, the combination of a ball screw mechanism and a motor or a linear motor. Accommodation rack 60 supported by rack support member 52 is lifted and lowered together with rack support member 52 by rack lifting and lowering section 53. Further, each of left unit 51*a* and right unit 51*b* includes frame front-rear moving section 54 that feeds exchange frame 70, 80 in accommodation rack 60 forward and backward from both left and right sides by a belt, a roller, or the like.

As illustrated in FIG. 1, accommodation rack 60 is an accommodation body that includes pair of left and right support rails 61 in multiple stages in the up-down direction, and that is capable of accommodating an exchange member (exchange frame 70, 80) on each pair of support rails 61. Accommodation rack 60 has opening portions 62 and 63 formed on the front face opposite to printing device main body 11 and the back face of printing device main body 11 side, respectively. The exchange member (exchange frame 70, 80) is taken in and out by the worker or the like through opening portion 62 on the front face side, and is conveyed in and out of printing device main body 11 by frame front-rear moving section 54 through opening portion 63 on the back surface side. In a state where accommodation rack 60 is received by exchanging device 50, frame front-rear moving section 54 feeds the exchange member that is supported on support rails 61 positioned at substantially the same height as conveyance rails 40 of printing device main body 11 by rack lifting and lowering section 53 among support rails 61 in multiple stages of accommodation rack 60, to printing device main body 11. Frame front-rear moving section 54 feeds the exchange member supported on conveyance rails 40 of printing device main body 11 to support rails 61 of accommodation rack 60 positioned at substantially the same height as conveyance rails 40. Accommodation rack 60 may be conveyed to the receiving position of exchanging device 50 by the worker, or may be mounted on an automated guided vehicle (AGV) and automatically conveyed to the receiving position of exchanging device 50 by the automated guided vehicle.

Exchange frame 70 is a frame body that supports screen mask M. Screen mask M is a thin metal plate, and is supported by exchange frame 70 with a predetermined tension applied. Screen mask M, while supported by exchange frame 70, is positioned and fixed at a working position on conveyance rails 40, and is used for printing.

As illustrated in FIG. 4, exchange frame 80 is a frame body that supports board support member 32, and has substantially the same left-right width as exchange frame 70. Exchange frame 80 includes rectangular outer frame 81, and pair of support arms 82 that are attached to outer frame 81 such that distal end portions thereof face each other and support board support member 32 from both sides at the distal end portions. A base end portion of a first one of support arms 82 is disposed in the vicinity of left edge portion 81*a* of outer frame 81 and is rotatably supported by rotation shaft 83 parallel to left edge portion 81*a*. A base end portion of a second one of support arms 82 is disposed in the vicinity of right edge portion 81*b* of outer frame 81 and is rotatably supported by the rotation shaft parallel to right edge portion 81*b*. Pair of support arms 82 are biased to a horizontal posture by springs and support board support member 32 in a horizontal posture. Further, pair of left and right support arms 82 are pressed downward by pusher 24 and spread apart downward, thereby releasing the support of board support member 32. As described above, pair of left and right second pressing portions 24*b* (see FIG. 3) are provided in pusher 24, and pusher 24 is lowered by pusher lifting and lowering section 25 from above pair of support arms 82 to press down pair of support arms 82 by pair of second pressing portions 24*b*.

In the present embodiment, as illustrated in FIG. 4, exchange frame 80 includes cam follower 84 and magnet member 85. Multiple (for example, five) cam followers 84 are attached to the lower surfaces of left edge portion 81*a* and right edge portion 81*b* of outer frame 81 so that exchange frame 80 can roll on conveyance rails 40.

In the present embodiment, magnet members 85 are formed of a permanent magnet, and are attached to an inner surface of edge portion 81*c* of outer frame 81 orthogonal to left edge portion 81*a* and right edge portion 81*b*. Edge portion 81*c* is one of two edge portions (the other being edge portion 81*d*) that are orthogonal to left edge portion 81*a* and right edge portion 81*b* of outer frame 81, and is on the distal end side in a direction from accommodation rack 60 toward the upper side of lifting and lowering table 34. The inner surface of edge portion 81*c* is a contact target surface by which first pressing portions 24*a* come into contact when exchange frame 80 is conveyed by being pushed forward and backward by first pressing portions 24*a* of pusher 24. First pressing portions 24*a* of pusher 24 are formed of a magnetic material. Therefore, by bringing first pressing portions 24*a* close to magnet members 85, pusher 24 is attracted to exchange frame 80 by the magnetic attraction force of magnet members 85.

As illustrated in FIG. 2, conveyance rails 40 are installed on fixed bases 43 to have substantially the same height as passage opening 38 in the middle stage portion of printing device main body 11 and are a pair of left and right long rails extending in the front-rear direction (Y-axis direction). As illustrated in FIGS. 5 and 6, conveyance rails 40 includes pair of left and right first conveyance surfaces 41 and pair of left and right second conveyance surfaces 42, which are provided inward and lower than pair of left and right first conveyance surfaces 41. Pair of left and right first conveyance surfaces 41 are used to convey exchange frame 70) (screen mask M), and support exchange frame 70 in a horizontal posture. Pair of left and right second conveyance surfaces 42 are used to convey exchange frame 80 (board support member 32), and support exchange frame 80 in a horizontal posture. As described above, cam followers 84 are attached to the lower surfaces of left edge portion 81*a* and right edge portion 81*b* of outer frame 81 of exchange frame 80, and exchange frame 80 travels on second conveyance surfaces 42 as cam followers 84 roll on second conveyance surfaces 42.

In addition, above pair of conveyance rails 40, multiple (for example, three) clamp sections 45 are provided along pair of right and left conveyance rails 40 to clamp exchange frame 70 (screen mask M) and exchange frame 80 (board support member 32). Each clamp section 45 includes contact portion 46 and lifting and lowering section 47 (for example, an air cylinder) installed on fixed base 43 to lift and lower contact portion 46. Each clamp section 45 clamps exchange frame 70, 80 to conveyance rails 40 by lowering contact portion 46 to press exchange frame 70, 80 against conveyance rails 40 by contact portion 46 in a state where exchange frame 70, 80 is positioned on conveyance rails 40.

Control device 100 is, as illustrated in FIG. 7, configured as a microprocessor made up mainly of CPU 101 and includes ROM 102, RAM 103, and storage device 104, in addition to CPU 101. Control device 100 exchanges signals with head device 20, board conveyance device 30, recognition section 35, clamp section 45, and exchanging device 50. In addition, control device 100 is communicably connected to management device 200 that manages a production line including printing device 10.

Next, an operation of printing device 10 configured as described above, particularly, an operation of conveying and exchanging screen mask M and board support member 32 together with exchange frame 70, 80 during a setup change will be described. Here, conveyance rails 40, pusher 24, pusher lifting and lowering section 25, and head moving section 26 of the present embodiment are examples of a conveyance device of the present disclosure.

The exchange of screen mask M is performed as follows. That is, CPU 101 of control device 100 first controls pusher lifting and lowering section 25 and head moving section 26 such that exchange frame 70, which is on first conveyance surfaces 41, supporting used screen mask M is pushed by pusher 24 to move on first conveyance surfaces 41, and exchange frame 70 is conveyed out of housing 12 through passage opening 38. Subsequently, CPU 101 controls exchanging device 50 such that exchange frame 70 is retrieved into accommodation rack 60. Next, CPU 101 controls exchanging device 50 such that exchange frame 70 supporting new screen mask M is taken out from accommodation rack 60 and is conveyed into housing 12 through passage opening 38. Then, CPU 101 controls pusher lifting and lowering section 25 and head moving section 26 such that conveyed-in exchange frame 70 is pushed by pusher 24 to move on first conveyance surfaces 41, thereby conveying and positioning exchange frame 70 (new screen mask M) to the working position.

Figure 8:
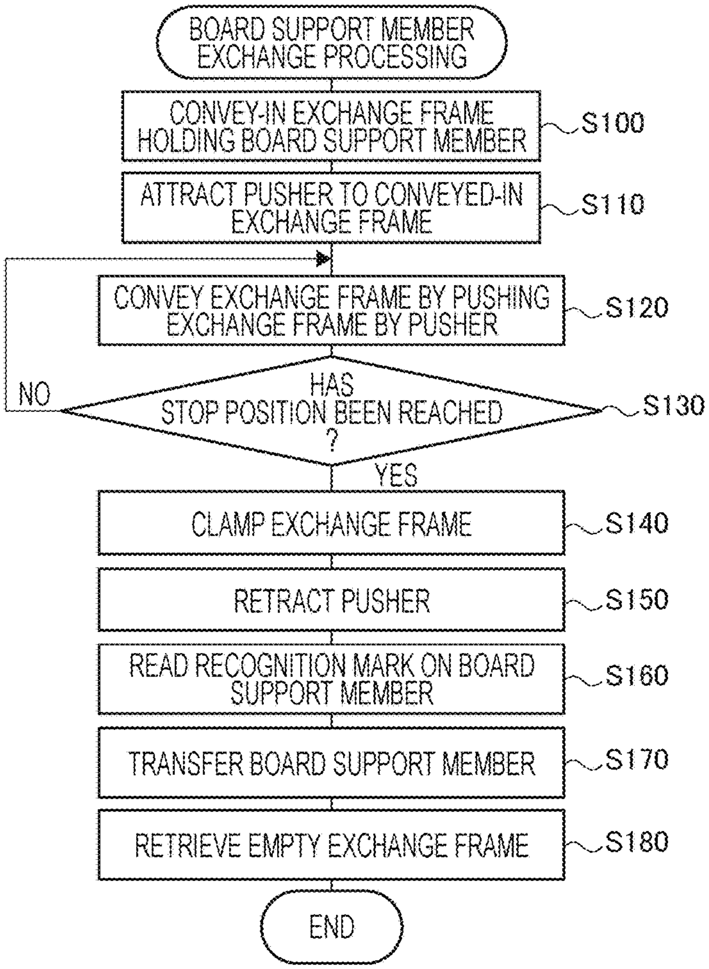
FIG. 8 is a flowchart illustrating an example of board support member exchange processing.
Figure 9:
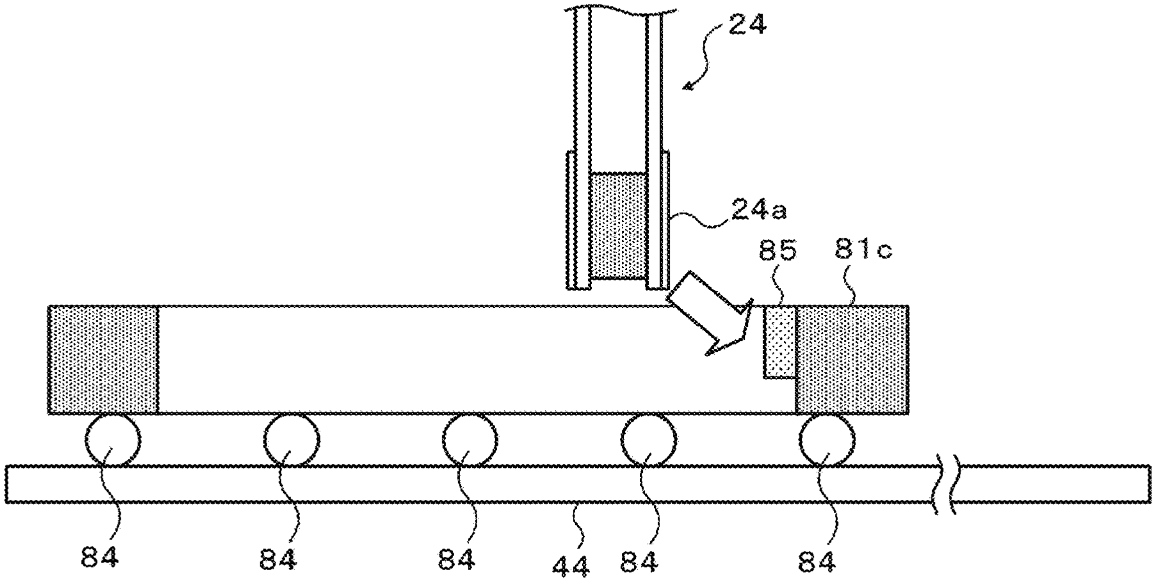
FIG. 9 is a view illustrating a state in which the pusher is attracted to the exchange frame.
Figure 10:
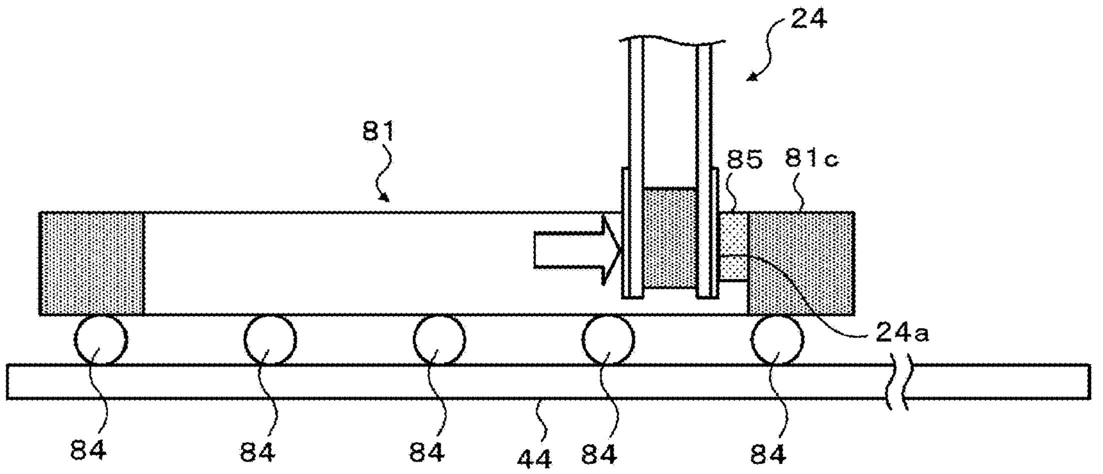
FIG. 10 is a view illustrating a state in which the exchange frame is pushed by the pusher and conveyed.
Figure 11:
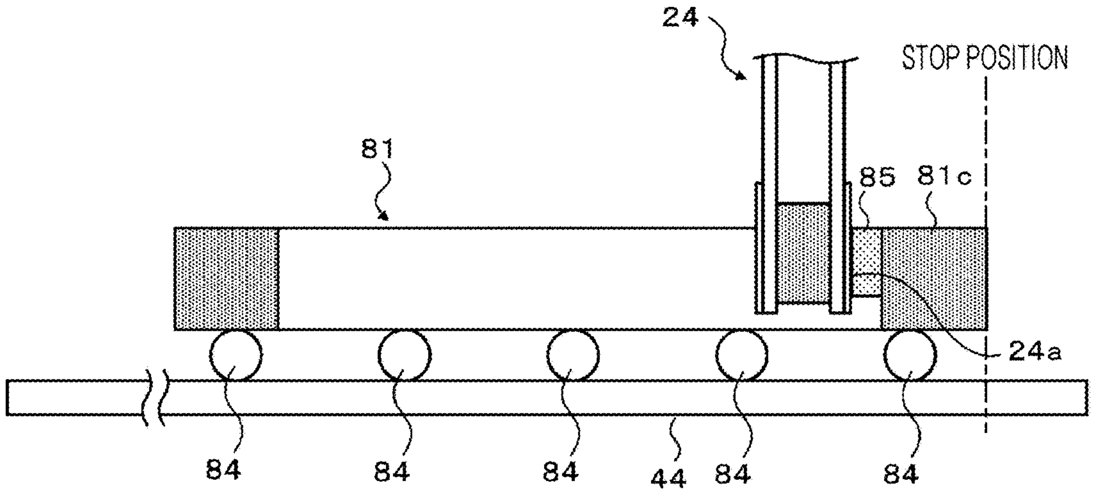
FIG. 11 is a view illustrating a state in which the exchange frame is stopped at a stop position.

Control device 100 also performs the exchange of board support member 32 according to the type of board S to be produced. FIG. 8 is a flowchart illustrating an example of board support member exchange processing executed by CPU 101 of control device 100. The board support member exchange processing is performed after screen mask M (exchange frame 70), which is on conveyance rails 40, is retracted into accommodation rack 60, and used board support member 32 placed on lifting and lowering table 34 is retrieved into accommodation rack 60. The retrieval of used board support member 32 is performed as follows. That is, CPU 101 takes out empty exchange frame 80 that does not support board support member 32 from accommodation rack 60, and conveys empty exchange frame 80 into housing 12 through passage opening 38. Subsequently, CPU 101 controls pusher lifting and lowering section 25 and head moving section 26 such that conveyed-in empty exchange frame 80 is pushed by pusher 24 to move on second conveyance surfaces 42, thereby conveying and positioning empty exchange frame 80 to the stop position (above lifting and lowering table 34). Next, CPU 101 transfers used board support member 32 placed on lifting and lowering table 34 from lifting and lowering table 34 to empty exchange frame 80. The transfer of board support member 32 from lifting and lowering table 34 to exchange frame 80 is performed as follows. CPU 101 controls pusher lifting and lowering section 25 such that pair of support arms 82 are pressed down by pair of second pressing portions **24*b* of pusher 24, thereby spreading pair of support arms 82 apart. Subsequently, CPU 101 controls board support member lifting and lowering section 33 such that lifting and lowering table 34 (with used board support member 32) is lifted so that used board support member 32 is positioned between pair of support arms 82. Then, CPU 101 controls pusher lifting and lowering section 25 such that pusher 24 is lifted, and the downward pressure on pair of support arms 82 exerted by pair of second pressing portions 24*b* is released. As a result, used board support member 32 is supported by pair of support arms 82. After used board support member 32 is supported by exchange frame 80, CPU 101 controls pusher lifting and lowering section 25 and head moving section 26 such that exchange frame 80 is pushed by pusher 24 to move on second conveyance surfaces 42, thereby conveying exchange frame 80 out of housing 12 through passage opening 38. Then, CPU 101 controls exchanging device 50 such that exchange frame 80 is retrieved into accommodation rack 60**.

Hereinafter, the board support member exchange processing will be described with reference to FIGS. 9 to 13.

In the board support member convey-in processing, first, CPU 101 of control device 100 controls exchanging device 50 such that exchange frame 80 supporting new board support member 32 is taken out from accommodation rack 60 and is conveyed into housing 12 through passage opening 38 (S100). Subsequently, CPU 101 controls pusher lifting and lowering section 25 and head moving section 26 such that pusher 24 is moved so that first pressing portions **24*a* of pusher 24 are attracted to magnet members 85 of conveyed-in exchange frame 80 (S110, see FIG. 9). Next, CPU 101 controls head moving section 26 such that exchange frame 80 is pushed by first pressing portions 24*a* of pusher 24 to move on second conveyance surfaces 42, thereby conveying exchange frame 80 (new board support member 32) (S120, see FIG. 10). Then, CPU 101 determines whether exchange frame 80 has reached the stop position (above lifting and lowering table 34) based on the signal from position sensor 29*b* (S130**).

Figure 12:
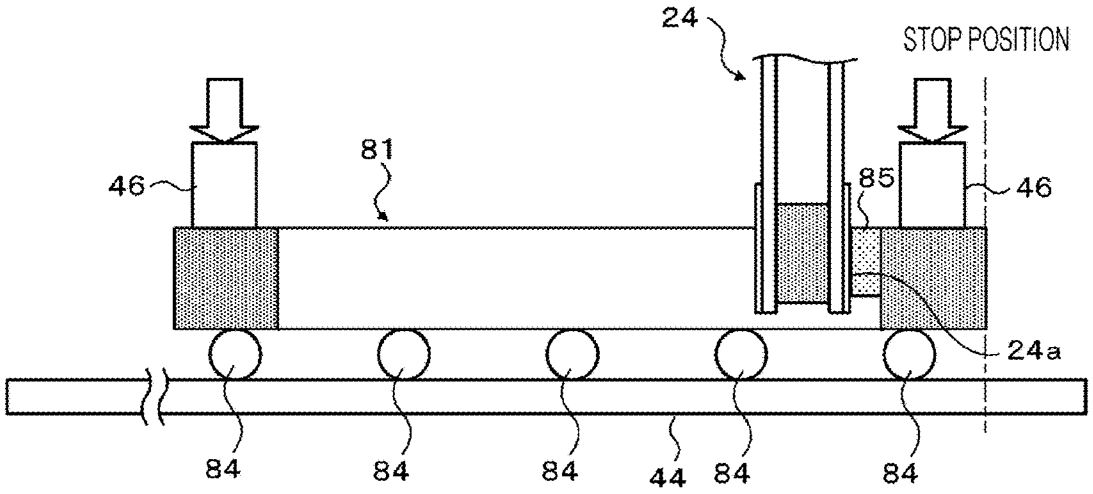
FIG. 12 is a view illustrating a state in which the exchange frame is clamped at the stop position.
Figure 13:
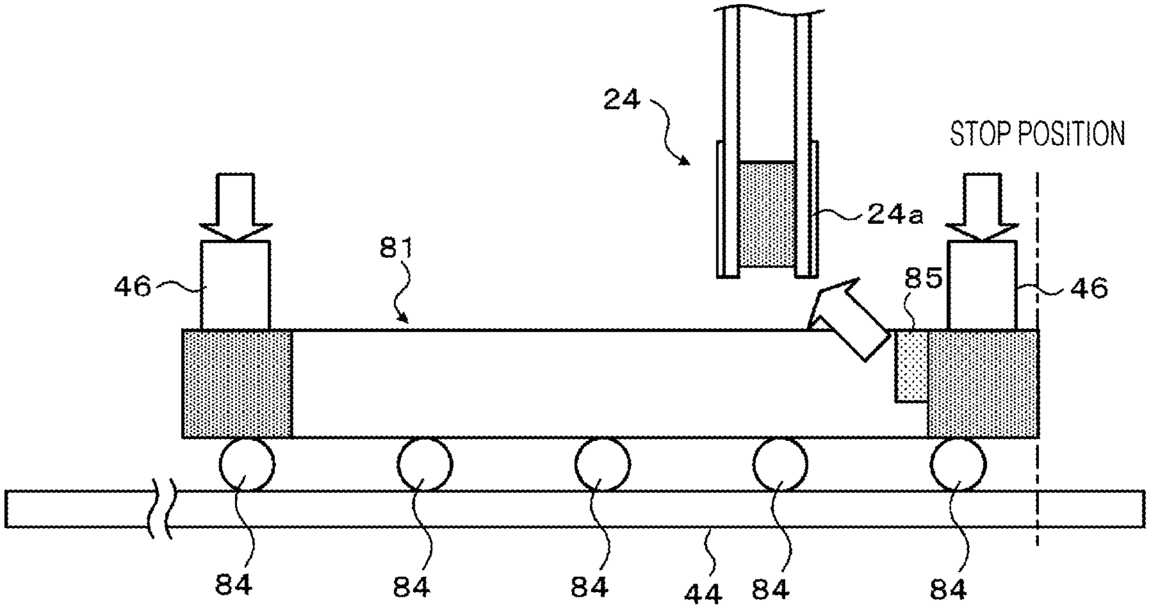
FIG. 13 is a view illustrating a state in which the pusher is retracted from the exchange frame.

When it is determined that exchange frame 80 has reached the stop position (see FIG. 11), CPU 101 stops the movement of pusher 24 by head moving section 26, and then controls clamp section 45 such that contact portion 46 is lowered, thereby pressing exchange frame 80 against second conveyance surfaces 42 with contact portion 46 to clamp exchange frame 80 (S140, see FIG. 12). After clamping exchange frame 80, CPU 101 controls pusher lifting and lowering section 25 and head moving section 26 such that pusher 24 is moved (retracted) so that first pressing portions **24*a* are detached from magnet members 85 of exchange frame 80 (S150, see FIG. 13**).

In this way, CPU 101 causes magnet members 85 of exchange frame 80 to attract first pressing portions **24*a* of pusher 24, then conveys exchange frame 80 by pushing exchange frame 80 by pusher 24 to the stop position, and after clamping exchange frame 80 at the stop position, retracts pusher 24 from exchange frame 80. Accordingly, even after pusher 24 stops pressing exchange frame 80, exchange frame 80 is prevented from moving due to inertia, and exchange frame 80 (board support member 32) can be more reliably positioned at the stop position. Therefore, the subsequent reading of the mark on board support member 32 and the transfer of board support member 32** can be performed more reliably.

Next, CPU 101 controls camera moving section 37 such that camera main body 36 is moved to a predetermined recognition position, and the mark attached to board support member 32 supported by exchange frame 80 at the recognition position is read by camera main body 36 (S160). When the reading is successful, CPU 101 transfers board support member 32 from exchange frame 80 to lifting and lowering table 34 (S170), retrieves empty exchange frame 80 into accommodation rack 60 (S180), and ends the board support member exchange processing. The transfer of board support member 32 from exchange frame 80 to lifting and lowering table 34 is performed, in a state where board support member lifting and lowering section 33 is caused to lift lifting and lowering table 34, by pressing down pair of support arms 82 by pair of second pressing portions **24*b* of pusher 24 above lifting and lowering table 34, thereby releasing the support of board support member 32 by pair of support arms 82. Further, the retrieval of empty exchange frame 80 is performed by controlling pusher lifting and lowering section 25 and head moving section 26 such that empty exchange frame 80 is pushed by pusher 24 to move on second conveyance surfaces 42, thereby conveying empty exchange frame 80 out of housing 12 through passage opening 38, and by controlling exchanging device 50 such that empty exchange frame 80 is retrieved into accommodation rack 60**.

Here, a correspondence relationship between main elements of the embodiment and main elements of the present disclosure will be described. That is, conveyance rails 40 (second conveyance surfaces 42) of the present embodiment are an example of rails of the present disclosure, exchange frame 80 (board support member 32) is an example of a conveyance target object, pusher 24 is an example of a pressing member, pusher lifting and lowering section 25 is an example of a lifting and lowering section, head moving section 26 is an example of a moving section, clamp section 45 is an example of a clamping section, and control device 100 is an example of a control section. Cam followers 84 are an example of rollers.

It is needless to say that the present disclosure is not limited to the embodiment described above in any way, and hence can be implemented in various aspects as long as the aspects fall within the technical scope of the present disclosure.

For example, in the above-described embodiment, exchange frame 80 is provided with magnet members 85, and first pressing portions 24*a* of pusher 24 are formed of a magnetic material. However, first pressing portions 24*a* of pusher 24 may be provided with a magnet member, and the surface of exchange frame 80 in contact with first pressing portions 24*a* may be formed of a magnetic material.

In the above-described embodiment, exchange frame 80 is conveyed by cam followers 84 provided in outer frame 81 rolling on second conveyance surfaces 42. However, cam followers 84 may be omitted, and exchange frame 80 may be conveyed by sliding on second conveyance surfaces 42.

In the above-described embodiment, second conveyance surfaces 42 are used for the conveyance of exchange frame 80 to which board support member 32 is attached. However, as long as second conveyance surfaces 42 are used in printing device 10, second conveyance surfaces 42 may also be used in conveying exchange frame to which another exchange member (for example, squeegee 22) other than screen mask M is attached. For the transfer of squeegee 22 to head main body 21 when squeegee 22 is attached to the exchange frame and conveyed on second conveyance surfaces 42 as the exchange member, for example, the method described in WO 2018/105016 may be used.

In the above-described embodiment, first pressing portions 24*a* of pusher 24 are attached to exchange frame 80, which is a frame body supporting board support member 32, and convey exchange frame 80 by pushing exchange frame 80. However, first pressing portions 24*a* of pusher 24 may be attracted to exchange frame 70, which is a frame body supporting screen mask M, and may convey exchange frame 70 by pushing exchange frame 70. In this case, a magnet member may be attached to the inner surface of an edge portion, which is one of two edge portions that are orthogonal to the left edge portion and the right edge portion of the outer frame of exchange frame 70, on the distal end side in the direction from accommodation rack 60 toward the working position. Alternatively, when the magnet member is provided in first pressing portions 24*a* of pusher 24, the surface of exchange frame 70 in contact with first pressing portions 24*a* may be formed of a magnetic material.

In the above-described embodiment, the conveyance device of the present disclosure is applied to printing device 10. However, the conveyance device may be applied to any other working device as long as the conveyance device conveys a member used in the production line.

As described above, the conveyance device of the present disclosure attracts a conveyance target object (an attraction target portion) to a pressing member (attraction portion), then conveys the conveyance target object to a predetermined position by pressing the conveyance target object by the pressing member, and after clamping the conveyance target object at the predetermined position, retracts the pressing member from the conveyance target object. Thus, the conveyance target object can be more reliably positioned at the predetermined position.

In the conveyance device according to the present disclosure, an attraction portion of the pressing member may be a first one of a magnet and a magnetic body, and an attraction target portion of the conveyance target object may be a second one of the magnet and the magnetic body. In this way, the pressing member can be attached to and detached from the conveyance target object with a simple configuration.

In the conveyance device of the present disclosure, the conveyance target object may include a roller rolling on the rails. In this way, the conveyance target object on the rail can be conveyed smoothly, and the conveyance target object can be more reliably positioned at the predetermined position.

In the present disclosure, in addition to the form of a conveyance device, a form of a conveyance method may be adopted, or a form of a printing device may be adopted.

INDUSTRIAL APPLICABILITY

The present disclosure can be applied to a manufacturing industry of a conveyance device and the like.

REFERENCE SIGNS LIST

10: printing device, 11: printing device main body, 12: housing, 20: head device, 21: head main body, 22: squeegee, 23: squeegee lifting and lowering section, 24: pusher, 24*a*: first pressing portion, 24*b*: second pressing portion, 25: pusher lifting and lowering section, 26: head moving section, 27: Y-axis slider, 28: guide rail, 30: board conveyance device, 31: board conveyance section, 32: board support member, 33: board support member lifting and lowering section, 34: lifting and lowering table, 35: recognition section, 36: camera main body, 37: camera moving section, 38: passage opening, 39: detection sensor, 40: conveyance rail, 41: first conveyance surface, 42: second conveyance surface, 43: fixed base, 45: clamp section, 46: contact portion, 47: lifting and lowering section, 50: exchanging device, 51*a*: left unit, 51*b*: right unit, 52: rack support member, 53: rack lifting and lowering section, 54: frame front-rear moving section, 60: accommodation rack, 61: support rail, 62, 63: opening portion, 70, 80: exchange frame, 81: outer frame, 81*a*: left edge portion, 81*b*: right edge portion, 81*c*: edge portion, 82: support arm, 83: rotation shaft, 84: cam follower, 85: magnet member, 100: control device, 101: CPU, 102: ROM, 103: RAM, 104: storage device, 200: management device, M: screen mask, S: board.

The invention claimed is:

1. A conveyance device comprising a pair of rails extending parallel to each other in a horizontal direction, the conveyance device being for conveying a conveyance target object used in a production line on the pair of rails, and positioning the conveyance target object at a predetermined position, the conveyance device comprising:

a pressing member having an attraction portion configured to attract an attraction target portion of the conveyance target object on a surface orthogonal to an extending direction of the rails;

a lifting and lowering section configured to lift and lower the pressing member;

a moving section configured to move the pressing member in the extending direction of the pair of rails;

a clamp section configured to clamp the conveyance target object on the pair of rails against the pair of rails; and a control section configured to control the lifting and lowering section and the moving section such that the pressing member is lowered and the attraction portion of the pressing member is attracted to the attraction target portion of the conveyance target object, control the moving section such that the conveyance target object is conveyed to the predetermined position, and after controlling the clamp section such that the conveyance target object is clamped at the predetermined position, and control the lifting and lowering section and the moving section such that the pressing member is retracted from the conveyance target object, wherein the attraction portion of the pressing member is a first one of a magnet and a magnetic body, and the attraction target portion of the conveyance target object is a second one of the magnet and the magnetic body.

2. The conveyance device according to claim 1, wherein the conveyance target object includes a roller rolling on the rails.

3. A conveyance method for conveying a conveyance target object used in a production line on a pair of rails and position the conveyance target object at a predetermined position using the pair of rails extending parallel to each other in a horizontal direction and a pressing member, the conveyance method comprising:

attracting the pressing member to the conveyance target object on a surface orthogonal to an extending direction of the rails, the pressing member including an attraction portion that is a first one of a magnet and a magnetic body, and the conveyance target object includes an attraction target portion that is a second one of the magnet and the magnetic body;

conveying the conveyance target object to the predetermined position by moving the pressing member in the extending direction of the rails; and retracting the pressing member from the conveyance target object after clamping the conveyance target object at the predetermined position.

* * * * *